United States Patent [19]

Persinski et al.

[11] 4,015,991

[45] Apr. 5, 1977

[54] LOW FLUID LOSS CEMENTING COMPOSITIONS CONTAINING HYDROLYZED ACRYLAMIDE/2-ACRYLAMIDO-2-METHYLPROPANE SULFONIC ACID DERIVATIVE COPOLYMERS AND THEIR USE

[75] Inventors: Leonard J. Persinski, Pittsburgh, Pa.; Michael M. Cook, Boxford, Mass.; Sally Lee Adams, Pittsburgh, Pa.

[73] Assignee: Calgon Corporation, Pittsburgh, Pa.

[22] Filed: May 10, 1976

[21] Appl. No.: 684,530

Related U.S. Application Data

[63] Continuation-in-part of Ser. No. 602,940, Aug. 8, 1975, abandoned.

[52] U.S. Cl. .................................. 106/90; 106/314; 166/293; 260/29.6 S

[51] Int. Cl.² .......................................... C04B 7/35
[58] Field of Search ........................... 106/90, 314; 260/29.6 S

[56] References Cited

UNITED STATES PATENTS 3,936,408   2/1976   Adams et al. ................ 106/90

*Primary Examiner*—J. Poer
*Attorney, Agent, or Firm*—Rudolph J. Anderson, Jr.; Harry E. Westlake, Jr.; Martin L. Katz

[57] ABSTRACT

Improved cementing compositions and their use in cementing operations is disclosed, wherein copolymers of hydrolyzed acrylamide and 2-acrylamido-2-methylpropane sulfonic acid derivatives are used as fluid loss additives for aqueous hydraulic cement slurries.

3 Claims, No Drawings

LOW FLUID LOSS CEMENTING COMPOSITIONS CONTAINING HYDROLYZED ACRYLAMIDE/2-ACRYLAMIDO-2-METHYLPROPANE SULFONIC ACID DERIVATIVE COPOLYMERS AND THEIR USE

This is a continuation-in-part application of copending application Ser. No. 602,940, filed Aug. 8, 1975, now abandoned.

BACKGROUND OF THE INVENTION:

1. Field of the Invention

The present invention relates to improved cementing operations, particularly cementing wells penetrating subterranean formations.

In particular, the present invention relates to additives to cementing compositions employed in cementing operations, for the purpose of reducing fluid loss from the cementing composition to the surrounding environment.

More particularly, the present invention relates to copolymers of hydrolyzed acrylamide and 2-acrylamido-2-methylpropane sulfonic acid derivatives as fluid loss additives to aqueous hydraulic cement slurries and the use of such slurries in cementing operations.

More particularly, the present invention concerns cementing of gas and oil wells employing aqueous hydraulic cement slurries containing copolymers of hydrolyzed acrylamide and 2-acrylamido-2-methylpropane sulfonic acid derivatives which reduce fluid loss from the cement slurry to the surrounding subterranean formation which the well has penetrated.

The term "aqueous hydraulic cement slurry" as employed herein is also intended to include aqueous suspensions or slurries of solids constituting raw materials, precursors, or intermediate materials used in preparation or manufacture of hydraulic cements as hereinafter defined. Thus, the present invention includes reducing the fluid loss of aqueous slurries of materials handled during conventional wet processing of cement. This improves the suspension of solids in the water being used as a vehicle to transport and intermix the solids during wet processing.

2. The Prior Art

Polymer compositions have long been used as additives to cementing compositions for the purpose of reducing water loss. For example, U.S. Pat. No. 2,614,998 discloses the use of water-soluble alkali salts of partially hydrolyzed polyacrylamide and polyacrylic acid for reducing the filtration of water from cement slurries. U.S. Pat. No. 2,865,876 discloses the use of sulfonated polystyrene as a fluid loss reducing additive. Other compositions known in the art to be useful for reducing fluid loss from cementing compositions are, among others, polyvinyl sulfonic acid disclosed in U.S. Pat. No. 2,905,565; the calcium soaps of alkyl sulfonic acids, alkaryl sulfonic acids, and petroleum sulfonic acids, disclosed in U.S. Pat. No. 3,052,628; poly(ar-vinylbenzyl)sulfonium alkyl substituted bases and salts disclosed in U.S. Pat. No. 3,094,501; and sulfonated poly(2,6-dimethylphenol) disclosed in U.S. Pat. No. 3,302,716.

SUMMARY OF THE INVENTION

Most industrial processes, especially in the construction industry, which entail the handling and emplacement of aqueous hydraulic cement slurries in situations such that they are likely to experience a significant fluid loss to the surrounding environment, are susceptible to improvement by the method of the present invention, which comprises addition to such aqueous hydraulic cement slurries of copolymers of hydrolyzed acrylamide and 2-acrylamido-2-methylpropane sulfonic acid derivatives as hereinafter described, whereby the fluid loss from the slurries is reduced. The present invention thus overcomes numerous problems created by the loss of any appreciable amount of water from a cement slurry during handling or cementing operations. For example, the lost water results in reduced fluidity of the cement, which, in turn, increases the pumping pressure required to move the cement slurry and makes correct emplacement of the cement slurry difficult. The fluid loss also results in premature thickening and setting for the cement. This will produce a set cement of nonuniform consistency and of reduced compressive strength. In the same manner, the method of the present invention improves well cementing operations.

In drilling and completion of wells, particularly gas and oil wells, a bore-hole is drilled through the overlying layers of the earth's crust to a geologic formation from which it is desired to recover a fluid mineral contained therein. A casing is then introduced into the wellbore and cemented in place. This secures the casing in position, preventing unwanted shifting of the casing when the fluid being produced from a formation moves through it under considerable pressure. The cement also serves the important function of sealing off porous formation adjacent to or penetrated by the wellbore. Typically, a cement slurry is pumped downwardly through tubing within the well casing and flows out of the open lower end of the casing at the well bottom. It is then forced upwardly around the casing in the annular space between the outer wall of the casing and the wall of the wellbore. Thus pumped into place, the cement slurry sets into a monolithic mass in situ. After setting, the cement prevents the flow of undesired fluids from one formation to another, especially into the formation producing gas or oil.

However, neat cement slurries, that is, those comprising hydraulic cement and water, are subject to high fluid loss in porous formations. The water of the slurry migrates into the formation and the cement solids of the slurry are filtered out onto the face of the formation. This loss of water from cement slurries is accelerated by the relatively high pressures required to inject cement slurries into the annular space between well casing and wellbore. This pressure often results in squeezing water from the slurry and forcing this water into the pores of the surrounding formation. This loss of water from cement slurries is also increased by the practice of mechanically scraping away the drilling mud from the wall of the wellbore prior to pumping of the cement slurry into position. This procedure exposes porous formations which absorb water from the slurry.

Numerous problems are created by the loss of any appreciable amount of water from a cement slurry during a well cementing operation. For example, the lost water may contaminate the producing formation. Where oil sands are encountered, the contaminating water may cause shaley impurities in the sand to swell, thus greatly reducing the permeability of the oil sand formation. The loss of water will result in reduced fluidity of the cement slurry. This in turn requires increased pumping pressures and jeopardizes the entire cementing operation. Proper emplacement of the cement slurry is rendered difficult, accurate prediction of pumping times and cement volumes is prevented, cementing operation costs are increased, and final results are unsatisfactory. The loss of water from the cement slurry results in thickening or premature setting of the cement, often making completion of the cementing operation either difficult or impossible. The loss of water tends to result in a set cement of non-uniform consistency and of reduced compressive strength. As is known in the cementing art, greater compressive strengths are obtained when reduced quantities of water are employed to make up the cement slurry. Thus, reduction of the loss of water from a cement slurry to surrounding formations will also result in a reduction of the initial amount of water required to make up the slurry. This will allow complete hydration of the cement with reduced amounts of water, resulting in set cements of greater compressive strength.

The present invention, therefore, is concerned with improved hydraulic cement slurry compositions and their use in cementing operations wherein the slurry composition is characterized by low water loss to surrounding porous formations during pumping of the cement slurry into place and the subsequent setting of the cement.

As used herein, the term "fluid loss" is intended to refer primarily to water loss, but is also intended to include minor amounts of other fluids which are subject to loss.

In accordance with the present invention, minor amounts of hydrolyzed acrylamide/2-acrylamido-2-methylpropane sulfonic acid derivative copolymer are added to an aqueous hydraulic cement slurry to reduce the rate of fluid loss from the slurry to any fluid-absorbing medium with which the slurry may come into contact.

The copolymer additives of the present invention are comprised of from about 10 to about 90 mole percent acrylamide hydrolyzed to the extent of at least 20 percent, and from about 90 to about 10 mole percent 2-acrylamido-2-methylpropane sulfonic acid derivative. The copolymer proportions expressed as mole percentages are based on unhydrolyzed acrylamide. Thus, the copolymer additives of the present invention may be represented by the following general formula:

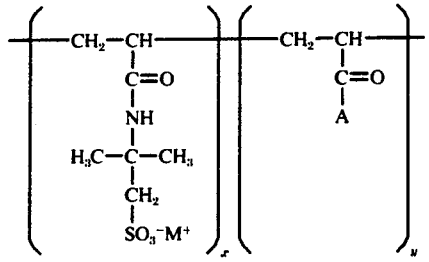

wherein A is independently selected from —NH$_2$ and —O$^-$M$^+$, provided that at least 20 percent of the A groups are —O$^-$M$^+$; M is hydrogen, ammonium, sodium or potassium; X is from about 10 to about 90 mole percent; and Y is from about 90 to about 10 mole percent.

The copolymer additive compositions of the present invention may be prepared by copolymerizing 2-acrylamido-2-methylpropane sulfonic acid and acrylamide in the desired molar proportions. The polymerization may be carried out in accordance with any of the well known free radical techniques in solution, suspension or emulsion environment. See, for example, U.S. Pat. No. 3,547,899. Nevertheless, such methods of polymerization as would occur to one skilled in the art may be employed, and the present invention is not limited to any particular method of preparing the copolymer additives set out herein.

The molecular weight of the copolymer additives of the present invention may be varied over a considerable range. The copolymer molecular weight may be as low as 10,000 or as high as one million or more, provided, of course, that the properties of an aqueous hydraulic cement slurry to which the copolymer be added, is not adversely affected thereby.

Complete or partial hydrolysis of the acrylamide component of the copolymer additives of the present invention may be accomplished by using any of the well known methods of hydrolysis which would occur to one skilled in the art. It is preferred, however, to employ alkaline hydrolyzing agents, particularly NaOH and KOH.

The compositions and methods of the present invention may employ any type of hydraulic cement. Hydraulic cement is defined as any cement which will set or cure under the action of water, and is intended to include all mixtures of lime, silica and alumina, or of lime and magnesia, silica, and alumina and iron oxide. Hydraulic cements include hydraulic limes, grappier cements, pozzolan cements, natural cements, and portland cements. Pozzolan cements include slag cements made from slaked lime and granulated blast furnace slag. Among these hydraulic cements, the portland cements are preferred chiefly because of their superior strength characteristics. The term portland cement is intended to include any cement regarded in the cementing art as a portland cement, usually as defined by standard reference works. The precise composition of any one particular portland cement will vary from another, but generally portland cements are produced by mixing and grinding together a calcareous and an argillaceous material, kiln heating the mixture (1350° to 1800° C.) until vitrification begins, pulverizing the clinker thus produced and mixing the same with a small amount of gypsum. The portland cements may be ground to any desired particle size, and grading of portland cements is on the basis of the specific surface of the cement, which will range between 1200 and 2600 square centimeters per gram. Grading is also based on the amount of cement particles retained on a No. 325 Screen, U.S. Sieve Series. Thus, preferred oil well cements have a specific surface of about 1480 square centimeters per gram and about 85% by weight passes through a No. 325 Screen.

The hydraulic cement may be employed alone in preparing the cementing composition of the present invention, merely being admixed with water and the low fluid loss additive, or it may have additionally incorporated therein any of a number of conventional cement additives. For example, the cement may include a minor portion, up to about 2.0% by weight of dry cement, of a retarder composition. Such an additive is preferred for oil well cements, since cementing operations are conducted under ambient well bottom temperatures which can exceed about 200° F. Examples of conventional retarder compositions include carboxymethylhydroxyethyl cellulose, borax, dehydrated borax, calcium lignosulfonate ferrochrome lignosulfonate.

Weighting components comprising inert materials such as barite and ilmenite are often employed. Silica may be employed to retard high temperature strength retrogression.

Other known additives conventionally employed with cementing compositions may be employed with the cementing compositions of this invention, and in amounts sufficient to produce the intended modification of the cementing composition characteristics for which any additive was selected. More than one such additive may, of course, be employed at the same time.

The dry hydraulic cement component of the cementing composition of the present invention is admixed with water to form a pumpable, settable cement slurry. The cement sets to form a monolithic solid. The water which is employed to form this cement slurry may be any naturally occurring water suitable for preparing cement slurries.

The amount of water employed to make up the hydraulic cement slurry is not critical, and generally the amount of water necessary to give a settable cement composition having the required characteristics will be in an amount of from about 25% to about 60% by weight, based on the weight of dry hydraulic cement. As discussed previously, the amount of water employed should be only such as is sufficient to produce a pumpable slurry. Use of the low water loss additives of the present invention makes it unnecessary to add excess water in anticipation of substantial water losses. The reduced initial water content will thereby tend to result in set cements of increased compressive strength.

The copolymer fluid loss additives of the present invention are employed in an amount sufficient to produce a measurable reduction in the loss of fluid from a cement slurry to which it has been added. Preferably, the amount employed will effect at least a 25 percent reduction in fluid loss. More preferably, the amount employed will effect a 50 percent reduction in fluid loss; and most preferably the amount employed will be sufficient to effect a fluid loss reduction in excess of 75 percent. While increasingly greater amounts of fluid loss reduction may be produced by employing correspondingly greater amounts of the fluid loss additives of this invention, reductions in excess of about 90 percent are usually not justified economically. Moreover, amounts of fluid loss additive necessary to produce extremely high reductions of fluid loss will also produce high reductions of fluid loss will also produce attendant difficulties with respect to undesirable effects on the properties of the cement slurry and set cement. As a general rule, a fluid loss of about 100 ml. over 30 minutes (as measured by the method set out in Example 2 below) is considered desirable.

Generally, the amount of copolymer fluid loss additive employed will be in the range of from 0.05 to about 5.0% by weight of dry hydraulic cement, and usually in an amount of from about 0.15 to about 2.0% by weight of dry hydraulic cement. In determining specific amounts, consideration must be given to such factors as the composition of the cement slurry to which the fluid loss additive is added, and the temperatures to be encountered by the cement slurry during the cementing operation.

The procedure for preparing the cementing compositions of the present invention does not require any particular sequence of steps. The copolymer low fluid loss additives of the present invention are water-soluble and thus may be mixed with the hydraulic cement before the addition of water, may be added to the slurry at the time of mixing, or may be added to the water before preparation of the cement slurry. When other conventional additives are employed, they may be incorporated into the final cement slurry composition in any known suitable manner.

The invention will be better understood from the following examples which illustrate the preparation and fluid loss reducing activity of representative copolymers of this invention.

| | |
|---|---|
| 116.4 g. | 2-acrylamido-2-methylpropane sulfonic acid |
| 14.7 g. | acrylamide |
| 328.0 g. | water |
| 45 g. | 50% NaOH solution |
| 0.69 g. | Lup-11 (t-butylperoxy-pivalate) |
| 1.0 ml. | ferrous ammonium sulfate solution (98.5 mg. Fe($NH_4$)$_2$($SO_4$)$_2$ in 500 ml. distilled water) |

All of the ingredients except the t-butylperoxy pivalate and ferrous ammonium sulfate catalysts were combined and mixed together in the water portion. The NaOH solution was employed for the purpose of neutralizing the 2-acrylamido-2-methylpropane sulfonic acid, bringing the reaction mixture to a pH of 7 to 8. The reaction mixture was then purged under nitrogen for 1 hour. The catalyst materials were then added separately to the reaction mixture, which was maintained at room temperature for 1.5 hours. The temperature of the reaction mixture was then raised to 55° C., at which it was maintained for 1 hour. The resulting polymer product was drum dried.

EXAMPLE 2

Hydrolysis of Acrylamide/2-Acrylamido-2-Methylpropane Sulfonic Acid Copolymer

A controlled 50% hydrolysis of the acrylamide/2-acrylamido-2-methylpropane sulfonic acid copolymer prepared in Example 1 above was carried out. A sample containing 45.3 g. of the copolymer was dissolved in 1500 ml. of water with the aid of a high speed stirrer. In 20 ml. of water were separately dissolved 1.68 g. of KOH (1.98 g. of 85% active reagent), and this base solution was then added to the polymer solution. The temperature of the resultant reaction mixture was raised to 60° C. and maintained for 1 hour. The final reaction product was drum dried. The molar ratio of acrylamide in the copolymer to the KOH hydrolyzing agent was 2:1 and a 50% hydrolysis of the copolymer was concluded, assuming a complete exhaustion of hydrolysis reactants.

In the same manner, a controlled 30% hydrolysis of the acrylamide/2-acrylamido-2-methylpropane sulfonic acid copolymer prepared in Example 1 above was carried out, employing 1.0 g. of KOH (1.18 g. of 85% active reagent) in 20 ml. of water.

EXAMALE 3

Evaluation of Fluid Loss Reducing Properties

The 30% and 50% hydrolyzed acrylamide/2-acrylamido-2-methylpropane sulfonic acid copolymers prepared as described above in Example 2, were evaluated for fluid loss reducing activity. A sample of unhydrolyzed acrylamide/2-acrylamido-2-methylpropane sulfonic acid copolymer prepared as described above in Example 1, was also evaluated in order to demonstrate the greatly increased performance resulting from hydrolysis of the acrylamide component of the copolymer. The evaluation procedure employed was that set out in API bulletin RP 10B, Nineteenth Edition, January 1974, Section 8, pages 43–44. A cement slurry was made up containing 600 g. Class H cement (API Class H cement has a fineness in the range of 1400–1600 sq. cm./g. and contains, in addition to free lime and alkali, the following compounds in the indicated proportions: tricalcium silicate — 52, dicalcium silicate — 25, tricalcium aluminate — 5, tetracalcium aluminoferrite —12, and calcium sulfate — 3.3.), 210 g. silica flour, and 6.0 g. fluid loss additive of the present invention (1.0% by weight of dry hydraulic cement) in 324 mls. of fresh water. These ingredients were mixed in a Waring Blender for 15 seconds at low speed, and then for 35 seconds at high speed. The resultant slurries were then mixed in a Halliburton Consistometer for 20 minutes at 100° F. The slurry samples were placed in a Baroid high pressure filter press cell maintained at 100° F. In the filter press cell the slurry samples were forced against a No. 325 U.S. Standard Sieve Series screen with 1000 p.s.i. pressure supplied by compressed nitrogen. The fluid removed from the slurry was collected and measured. Constant pressure was maintained and the filtrate collected over a 30 minute period. Results were reported as volume of filtrate (in mls.) collected in a 30 minute period. The results obtained are illustrated in the following table:

| Sample | % Hydrolysis | Additive Concentration (% by weight) | Viscosity (Units of Consistency) | Fluid Loss ml/30 min. |
|---|---|---|---|---|
| Copolymer of acrylamide/2-acrylamido-2-methylpropane sulfonic acid | 30 | 1.0 | 20 | 58 |
| sulfonic acid | 50 | 1.0 | 19 | 60 |
| sulfonic acid | none | 1.0 | 10 | 241 |
| Neat Cement | — | — | — | 1000* |

*For neat cement (hydraulic cement and water only) virtually all water present was removed in less than one minute, and the value indicated was obtained by extrapolation.

What is claimed is:

1. A low fluid loss cement composition capable of forming a fluid slurry when mixed with water, said cement composition comprising dry hydraulic cement and from about 0.05 to about 5.0 percent by weight, based on weight of hydraulic cement on a dry basis, of a water-soluble copolymer having a molecular weight of at least 10,000, said copolymer having the formula:

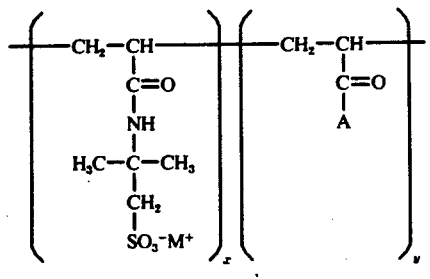

wherein A is independently selected from —NH$_2$ and —$^-$M$^-$, provided at least 20 percent of the A groups are —$^-$M$^+$; M is hydrogen, ammonium, sodium or potassium; x is from about 10 to about 90 mole percent; and y is from about 90 to about 10 mole percent.

2. An hydraulic cement slurry composition comprising dry hydraulic cement; from about 0.05 to about 5.0 percent by weight, based on weight of hydraulic cement on a dry basis, of a water-soluble copolymer having a molecular weight of at least 10,000, said copolymer having the formula:

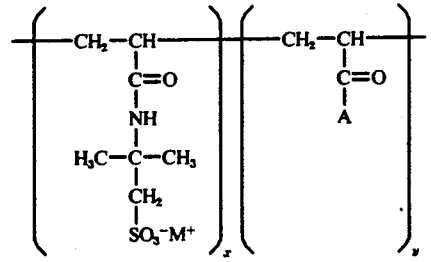

wherein A is independently selected from —NH$_2$ and —O$^-$M$^-$, provided at least 20 percent of the A groups are —O$^-$M$^-$; M is hydrogen, ammonium, sodium or potassium; x is from about 10 to about 90 mole percent; and y is from about 90 to about 10 mole percent; and sufficient water to form a pumpable slurry.

3. A method of producing an hydraulic cement aqueous slurry composition admixing together hydraulic cement, from about 0.05 to about 5.0 percent by weight, based on weight of hydraulic cement on a dry basis, of a water-soluble copolymer having a molecular weight of at least 10,000, said copolymer having the formula:

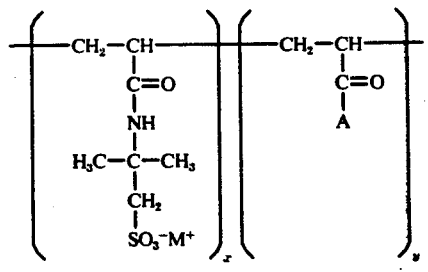

wherein A is independently selected from —NH$_2$ and —O$^-$M$^+$, provided at least 20 percent of the A groups are —O$^-$M$^+$; M is hydrogen, ammonium, sodium or potassium; x is from about 10 to about 90 mole percent; and y is from about 90 to about 10 mole percent; and sufficient water to form a pumpable slurry.

* * * * *

UNITED STATES PATENT OFFICE
CERTIFICATE OF CORRECTION

PATENT NO. : 4,015,991
DATED : April 5, 1977
INVENTOR(S) : Leonard J. Persinski, Michael M. Cook and Sally Lee Adams It is certified that error appears in the above-identified patent and that said Letters Patent are hereby corrected as shown below:

Column 6, at lines 13 and 14 insert --

EXAMPLE 1
Preparation of Acrylamide/2-Acrylamido-2-Methylpropane Sulfonic Acid Copolymer The reaction ingredients consisted of the following materials and amounts: --.

Column 7, lines 14 and 15, "tricalciun" should read -- tricalcium --.

Column 7, Claim 1, line 69 " - $^-M^-$ " should read -- $-O^-M^+$ --.

Column 8, Claim 1, line 1 " - $^-M^+$ " should read -- $-O^-M^+$ --.

Column 8, Claim 2, lines 25 and 26 " $-O^-M^-$ " should read -- $-O^-M^+$ --.

Signed and Sealed this ninth Day of August 1977

[SEAL]

Attest:

RUTH C. MASON
Attesting Officer

C. MARSHALL DANN
Commissioner of Patents and Trademarks